United States Patent
Abe et al.

(10) Patent No.: US 8,390,872 B2
(45) Date of Patent: Mar. 5, 2013

(54) IMAGE FORMING APPARATUS AND COMPUTER PROGRAM PRODUCT DETERMINING LAYOUT OF IMAGES ON CONTINUOUS PAPER IN PARALLEL BASED ON INSTRUCTIONS FROM DIFFERENT PRINT JOBS

(75) Inventors: Masahiko Abe, Saitama (JP); Shinichi Takahashi, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 492 days.

(21) Appl. No.: 12/702,182

(22) Filed: Feb. 8, 2010

(65) Prior Publication Data
US 2011/0069329 A1 Mar. 24, 2011

(30) Foreign Application Priority Data
Sep. 24, 2009 (JP) ................. 2009-218606

(51) Int. Cl.
*H04N 1/387* (2006.01)
*G06K 15/02* (2006.01)

(52) U.S. Cl. ...................................... 358/1.18; 358/450

(58) Field of Classification Search ................. 358/1.18, 358/450; 382/294, 295
See application file for complete search history.

(56) References Cited

U.S. PATENT DOCUMENTS

| 6,821,038 B2 * | 11/2004 | Izawa | 400/621.1 |
| 7,937,180 B2 * | 5/2011 | Newman | 700/125 |
| 2004/0150856 A1 * | 8/2004 | Asai | 358/1.18 |

FOREIGN PATENT DOCUMENTS

| JP | 10-097396 A | 4/1998 |
| JP | 2002-281278 A | 9/2002 |
| JP | 2007-229962 A | 9/2007 |

* cited by examiner

*Primary Examiner* — Scott A Rogers
(74) *Attorney, Agent, or Firm* — Sughrue Mion, PLLC

(57) ABSTRACT

An image forming apparatus includes an image output unit that outputs an image to a continuous paper; a generator that generates an image based on a print instruction by executing drawing processing; a determining unit that determines an image layout to output a plurality of images on the continuous paper in parallel based on at least two print instructions; and a combining unit that combines the plurality of images generated by the generator on the basis of the image layout determined by the determining unit; a controller that controls the image output unit so that the plurality of images combined by the combining unit is output to the continuous paper.

10 Claims, 16 Drawing Sheets

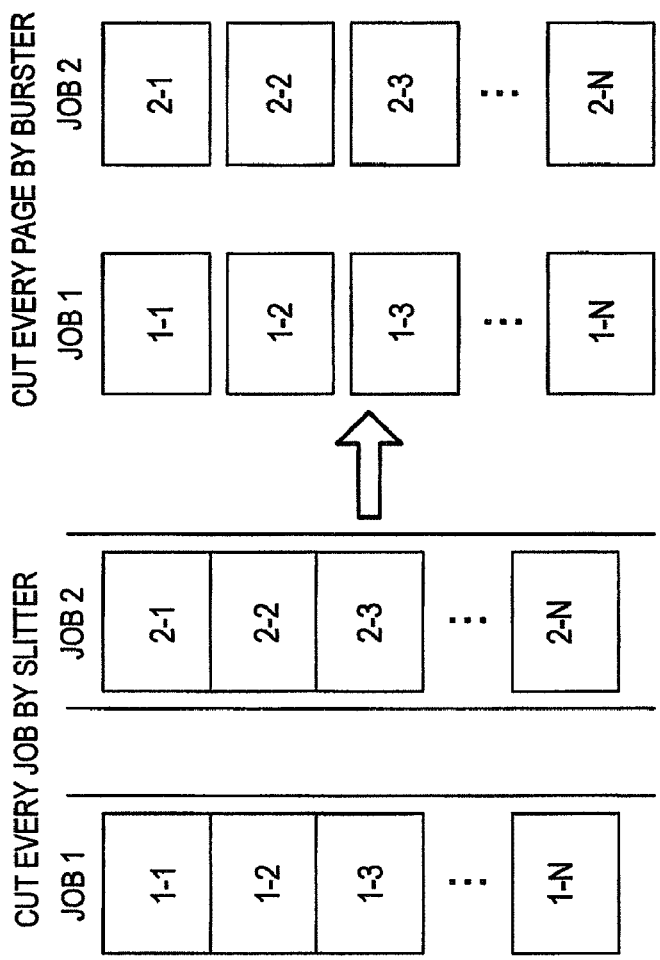
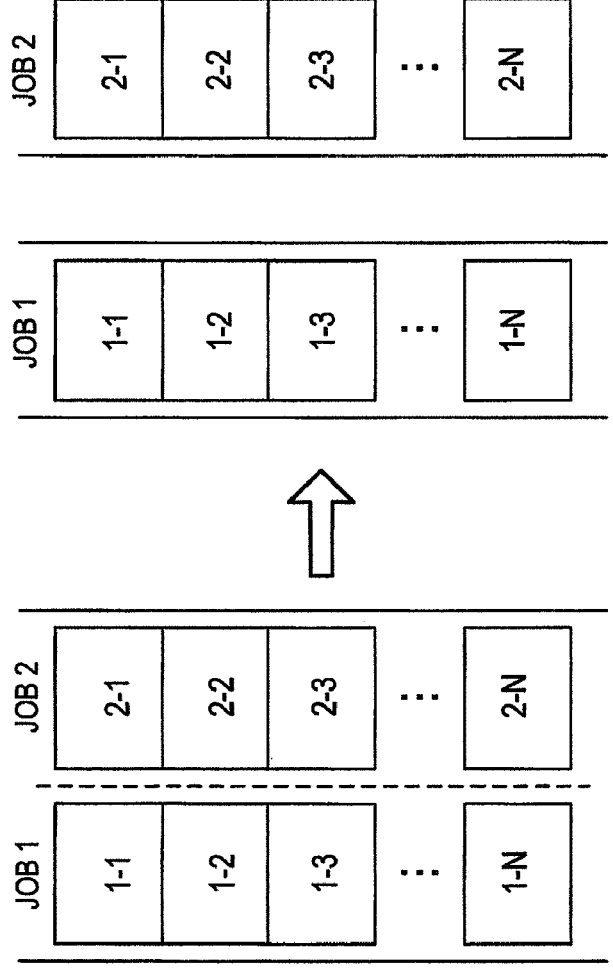
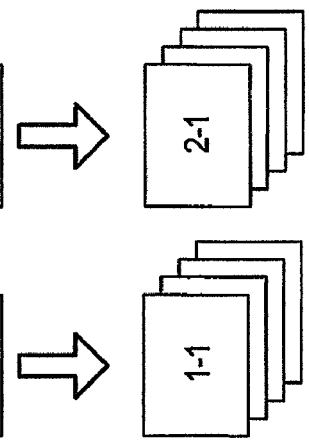

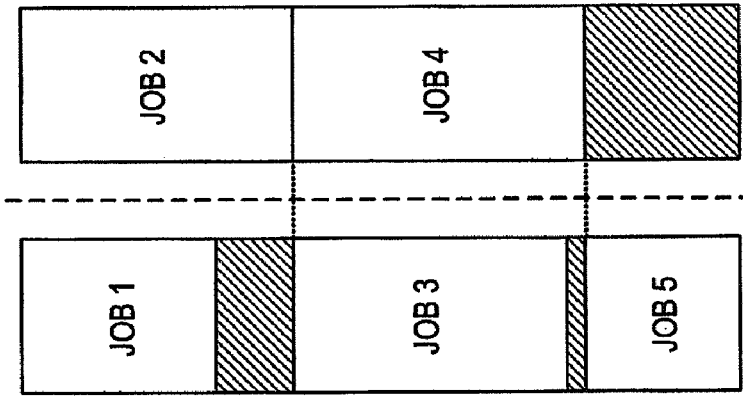
FIG.13B WHEN JOB HEAD ALIGNMENT IS PERFORMED
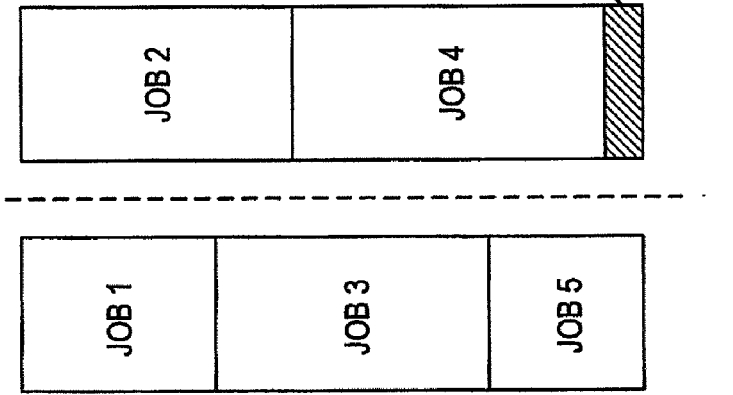
FIG.13A WHEN JOB HEAD ALIGNMENT IS NOT PERFORMED

FIG.15

| JOB NUMBER | PAGE LENGTH | NUMBER OF PAGES | JOB LENGTH |
| --- | --- | --- | --- |
| JOB 1 | 12 INCHES | 100 PAGES | 1200 INCHES |
| JOB 2 | 12 INCHES | 50 PAGES | 600 INCHES |
| JOB 3 | 12 INCHES | 70 PAGES | 840 INCHES |
| JOB 4 | 12 INCHES | 60 PAGES | 720 INCHES |
| JOB 5 | 12 INCHES | 50 PAGES | 600 INCHES |
| JOB 6 | 12 INCHES | 50 PAGES | 600 INCHES |
| JOB 7 | 12 INCHES | 120 PAGES | 1440 INCHES |

IMAGE FORMING APPARATUS AND COMPUTER PROGRAM PRODUCT DETERMINING LAYOUT OF IMAGES ON CONTINUOUS PAPER IN PARALLEL BASED ON INSTRUCTIONS FROM DIFFERENT PRINT JOBS

CROSS-REFERENCE TO RELATED APPLICATIONS

This application is based on and claims priority under 35 USC 119 from Japanese Patent Application No. 2009-218606 filed on Sep. 24, 2009.

BACKGROUND

1. Technical Field

The present invention relates to an image forming apparatus, a print apparatus and a computer readable medium storing program.

2. Summary

According to an aspect of the present invention, there is provided an image forming apparatus including: an image output unit that outputs an image to a continuous paper; a generator that generates an image based on a print instruction by executing drawing processing; a determining unit that determines an image layout to output a plurality of images on the continuous paper in parallel based on at least two print instructions; and a combining unit that combines the plurality of images generated by the generator on the basis of the image layout determined by the determining unit; a controller that controls the image output unit so that the plurality of images combined by the combining unit is output to the continuous paper.

BRIEF DESCRIPTION OF THE DRAWINGS

Exemplary embodiments of the present invention will be described in detail based on the following figures, wherein:

FIG. 6 is a diagram showing a process in which continuous paper onto which images based on plural print jobs are output in parallel is processed in a post-processing device;

FIG. 13A shows an example of an image layout when job head alignment is not selected;

FIG. 13B shows an example of the image layout when the job head alignment is selected;

FIG. 15 is a diagram showing seven print jobs transmitted from a host terminal device to the print apparatus.

DETAILED DESCRIPTION

An exemplary embodiment according to the present invention will be described with reference to the drawings.

Figure 1:
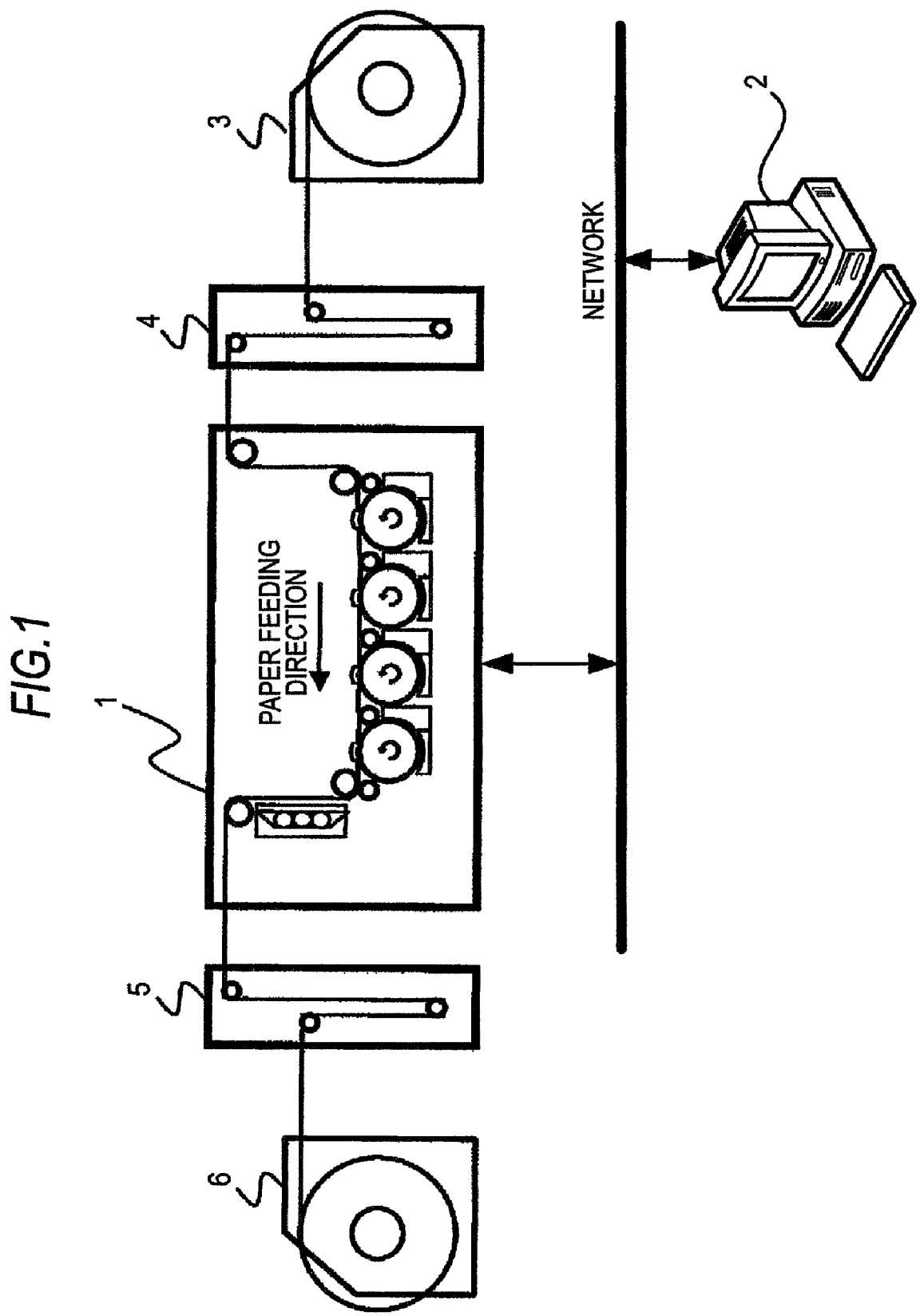
FIG. 1 is a system diagram showing the construction of a print system according to an exemplary embodiment of the present invention.

FIG. 1 is a diagram showing an example of the construction of a print system containing a print apparatus (image forming apparatus) 1 according to an exemplary embodiment of the present invention. This print system includes a pre-processing device 3, a buffer device 4, the print device 1 according to the exemplary embodiment of the present invention, a buffer device 5, a post-processing device 6 and a host terminal device 2 as shown in FIG. 1.

The pre-processing device 3 executes pre-processing such as feed-out of a recording medium such as print paper, a print sheet or the like (hereinafter generically referred to as "print paper") which has not yet been printed, etc. The post-processing device 6 executes post-processing such as take-up of print paper which has been printed. The buffer devices 4 and 5 are provided to keep tension of print paper between the pre-processing device 3 and the print apparatus 1 and between the print apparatus 1 and the post-processing device 6, respectively.

Figure 2:
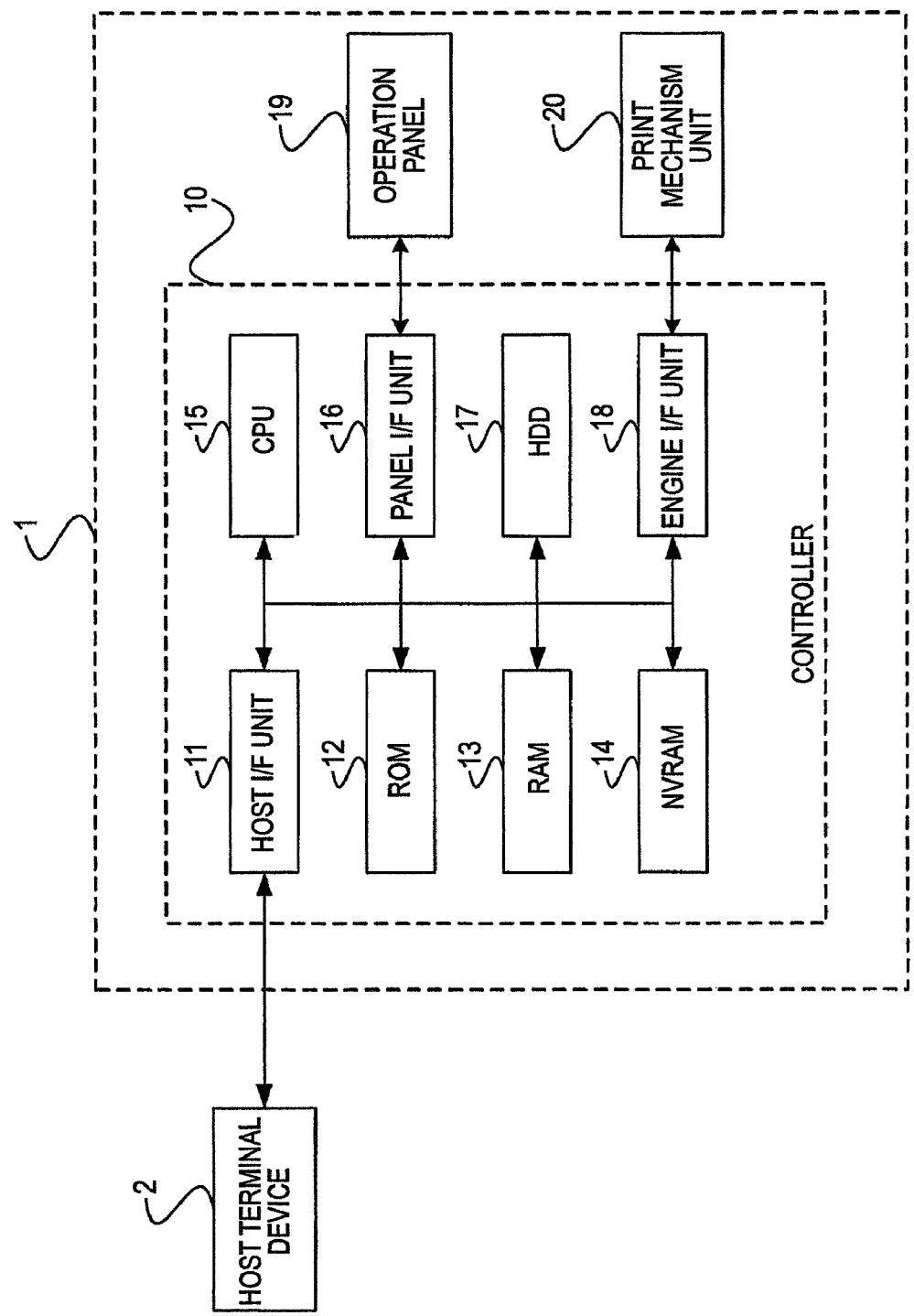
FIG. 2 is a block diagram showing the construction of a print apparatus according to the exemplary embodiment of the present invention.

Next, the schematic configuration of the print apparatus according to the exemplary embodiment of the present invention will be described with reference to FIG. 2. As shown in FIG. 2, the print apparatus 1 according to this exemplary embodiment includes a controller 10, an operation panel 19 and a print mechanism unit 20.

The print mechanism unit 20 is a mechanism for actually executing print processing on print paper, and functions as an image output unit for outputting an image onto continuous paper. The operation panel 19 is a unit for inputting an instruction from an operator, a user or the like, and displaying a notification to the operator, the user or the like.

The controller 10 includes a host I/F unit 11, ROM 12, RAM 13, NVRAM (Non-Volatile RAM) 14, CPU 15, a panel I/F unit 16, HDD 17 and an engine I/F unit 18.

The host I/F unit 11 executes communication processing with the host terminal device 2. The engine I/F unit 18 executes communication processing with the print mechanism unit 20. The panel I/F unit 16 executes communication processing with the operation panel 19.

ROM 12, RAM 13, NVRAM 14, HDD 17, etc. store various kinds of control programs and also store various kinds of data such as print data, etc. CPU 15 controls the host I/F unit 11, ROM 12, RAM 13, NVRAM 14, the panel I/F unit 16, HDD 17 and the engine I/F unit 18.

As shown in FIG. 2, the controller 10 is a general-purpose computer for executing specific processing on the basis of the print control program by CPU 15. This print control program is read from a storage medium such as ROM 12, HDD 17 or the like into CPU 15 and executed by CPU 15 to control the operation of the print apparatus 1. The print control program according to this exemplary embodiment may be recorded in a recording medium such as CD-ROM or the like, or distributed through a network.

Figure 3:
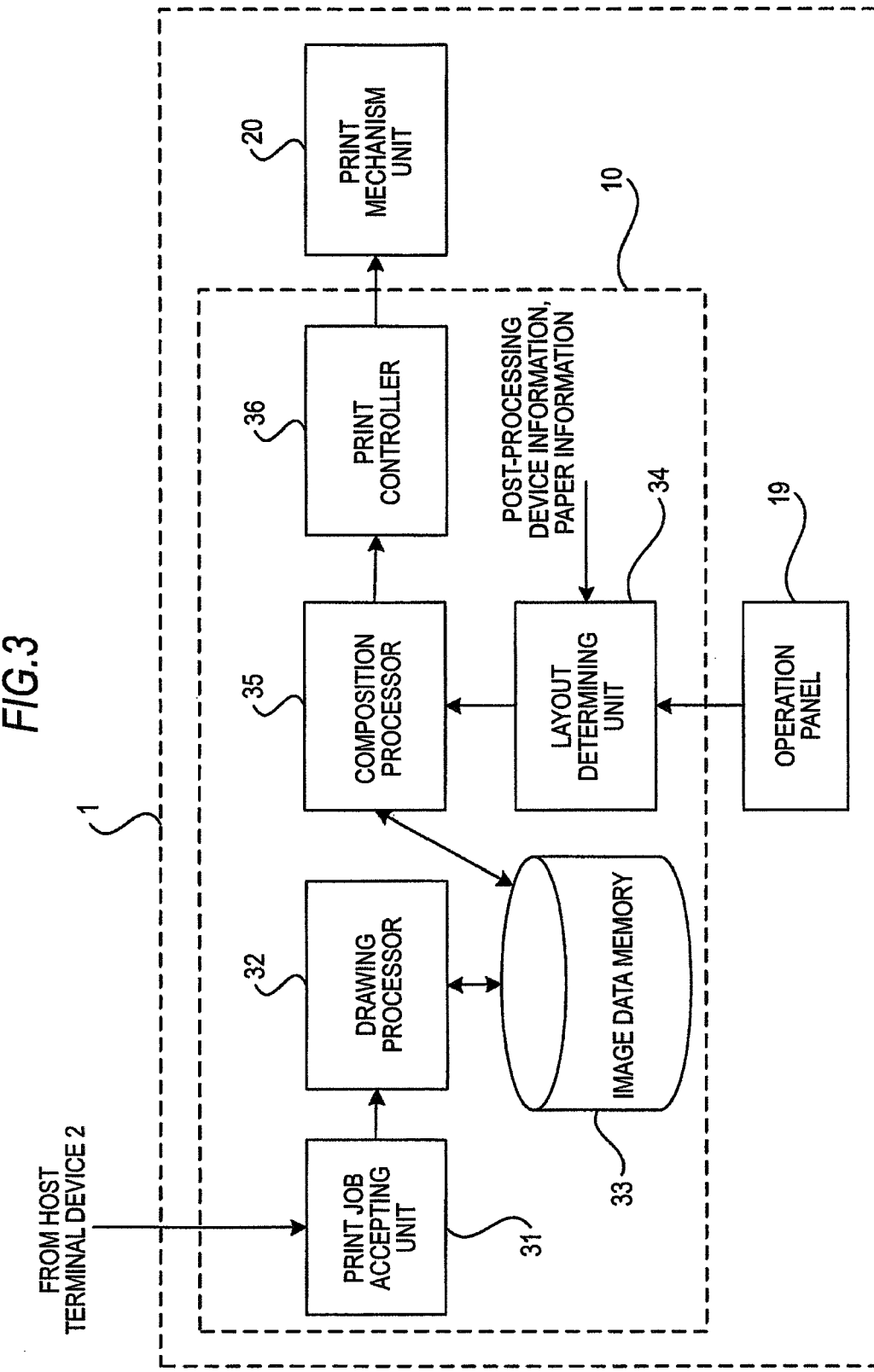
FIG. 3 is a diagram showing an example of the functional configuration of a controller of the print apparatus according to the exemplary embodiment of the present invention.

FIG. 3 is a diagram showing an example of the functional configuration of the controller 10 in FIG. 2 which is implemented by executing the print control program described above.

This controller 10 functions as a print control device. As shown in FIG. 3, it has a print job accepting unit 31, a drawing processor 32, an image data memory 33, a layout determining unit 34, a composition processor 35 and a print controller 36.

The print job accepting unit 31 accepts a print job (print instruction) transmitted from the host terminal device 2, and successively stores the accepted print job.

The drawing processor 32 executes drawing processing on the basis of the print job accepted by the print job accepting unit 31, and generates image data (raster image data) to be output onto continuous paper. The drawing processing target data may contain not only data described by PDL (page-description language), but also data of PDF (Portable Document Format) document. In this case, the data of the PDF document is directly interpreted, and subjected to the drawing processing.

The image data memory 33 stores image data generated through the drawing processing of the drawing processor 32.

The layout determining unit 34 determines an image layout (arrangement) for outputting plural image data based on at least two print jobs onto continuous paper in parallel on the basis of a user's instruction input through the operation panel 19, post-processing device information as information from the post-processing device connected to the print apparatus 1, sheet information such as information of a paper width of the continuous paper which is set in the print mechanism unit 20 or the like.

Here, the output onto continuous paper in parallel means that plural images based on different print jobs are arranged and output in a direction (main scan direction) perpendicular to a transporting direction (auxiliary scan direction) of the continuous paper.

On the basis of the image layout determined by the layout determining unit 34, the composition processor 35 combines plural image data which are generated by the drawing processor 32 and stored in the image data memory 33.

The print controller 36 controls the print mechanism unit 20 so that the image data combined by the composition processor 35 are output onto the continuous paper.

Figure 4:
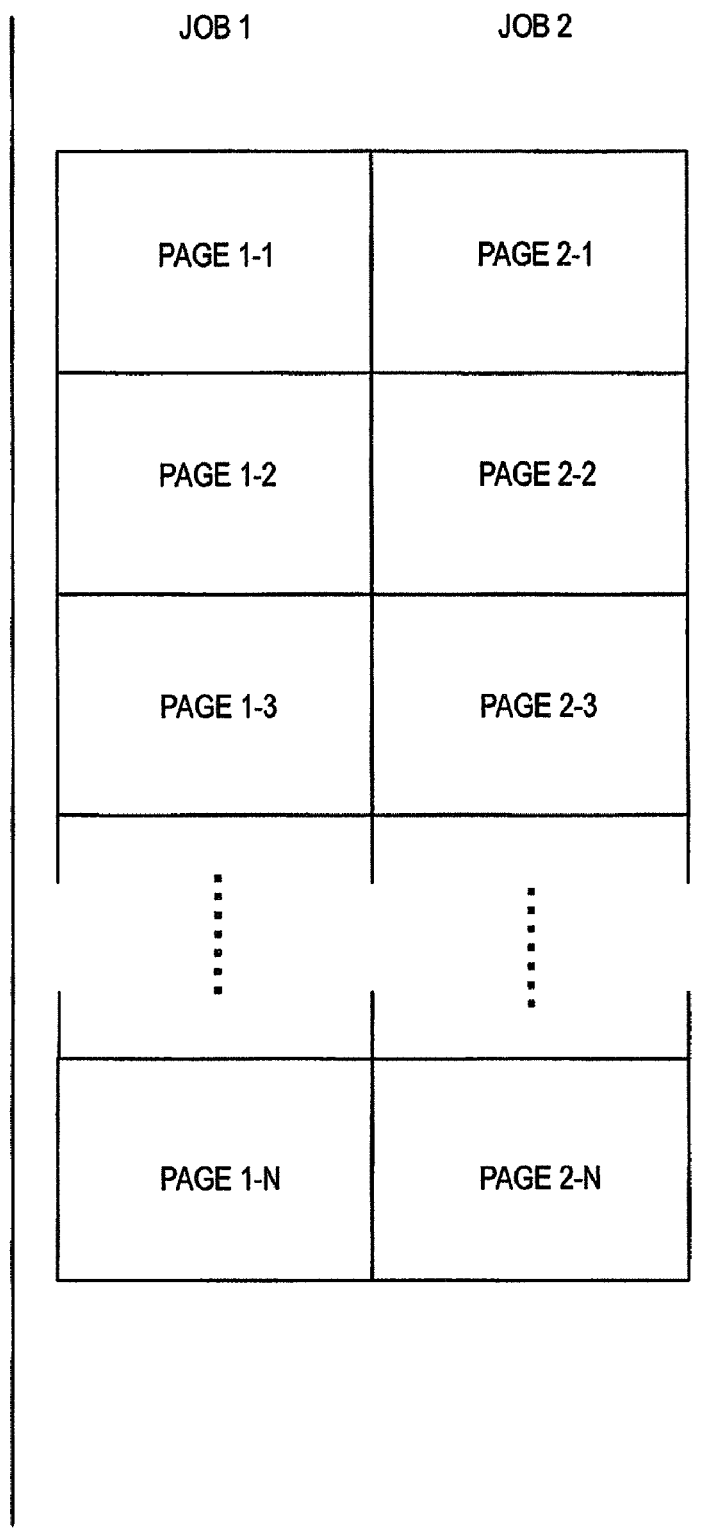
FIG. 4 is a diagram showing an example when two print jobs of a job 1 and a job 2 are output onto continuous paper in parallel.

FIG. 4 shows an example of printed continuous paper onto which the images based on the plural print jobs are output in parallel as described above. In the example of FIG. 4, the two print jobs of the job 1 and the job 2 are output onto the continuous paper in parallel.

The layout determining unit 34 may be configured to set such a layout that each margin area required to cut out printed continuous paper by a slitter (paper cutting device) is arranged between images corresponding to different print jobs. Specifically, the layout determining unit 34 may determine the layout of images so that an area having a predetermined width is provided between images based on different print jobs. Furthermore, the layout determining unit 34 may determine the layout of images so that an area having a width based on information from the slitter is provided between images based on different print jobs. Still furthermore, the width of the margin area may be set by a user.

Figure 5:
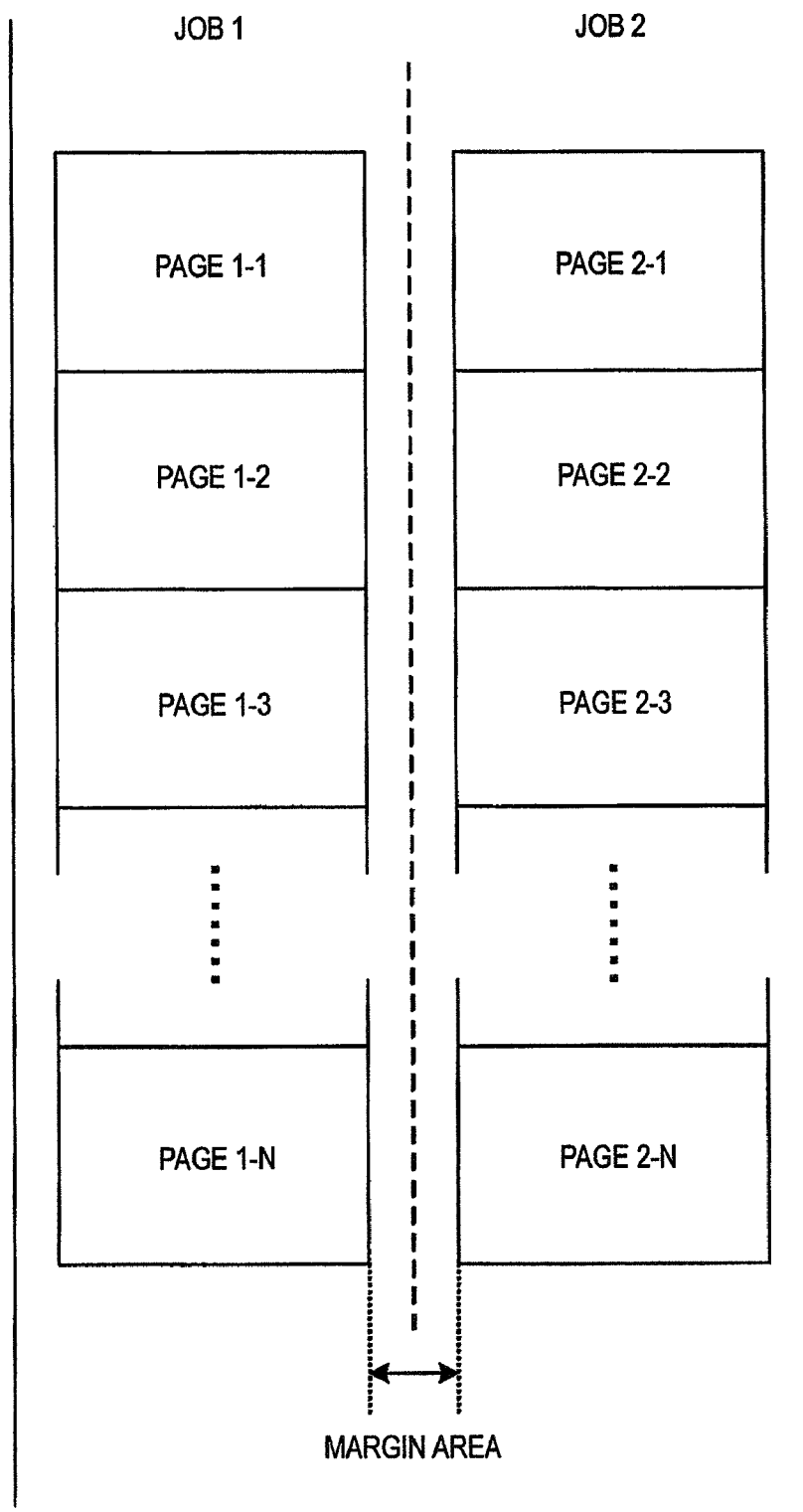
FIG. 5 is a diagram showing an example when a margin area is provided between images of plural print jobs which are output in parallel.

FIG. 5 shows an example when a margin area is provided between images of plural print jobs which are output in parallel. In the example of FIG. 5, a margin area is provided between the job 1 and the job 2.

FIGS. 6A to D show a process in which continuous paper onto which images based on plural print jobs are output in parallel as described above is processed in the post-processing device. FIG. 6A shows continuous paper onto which the images based on the two print jobs of the job 1 and the job 2 are output in parallel. The printed continuous paper is cut out every print job by the slitter (paper cutting device) as shown in FIG. 6B. Then, the cut-out continuous paper is further cut out into sheets every page by a burster (page cutting device) as shown in FIG. 6C, and a print result in which the sheets are successively collated is obtained as shown in FIG. 6D.

Figure 7:
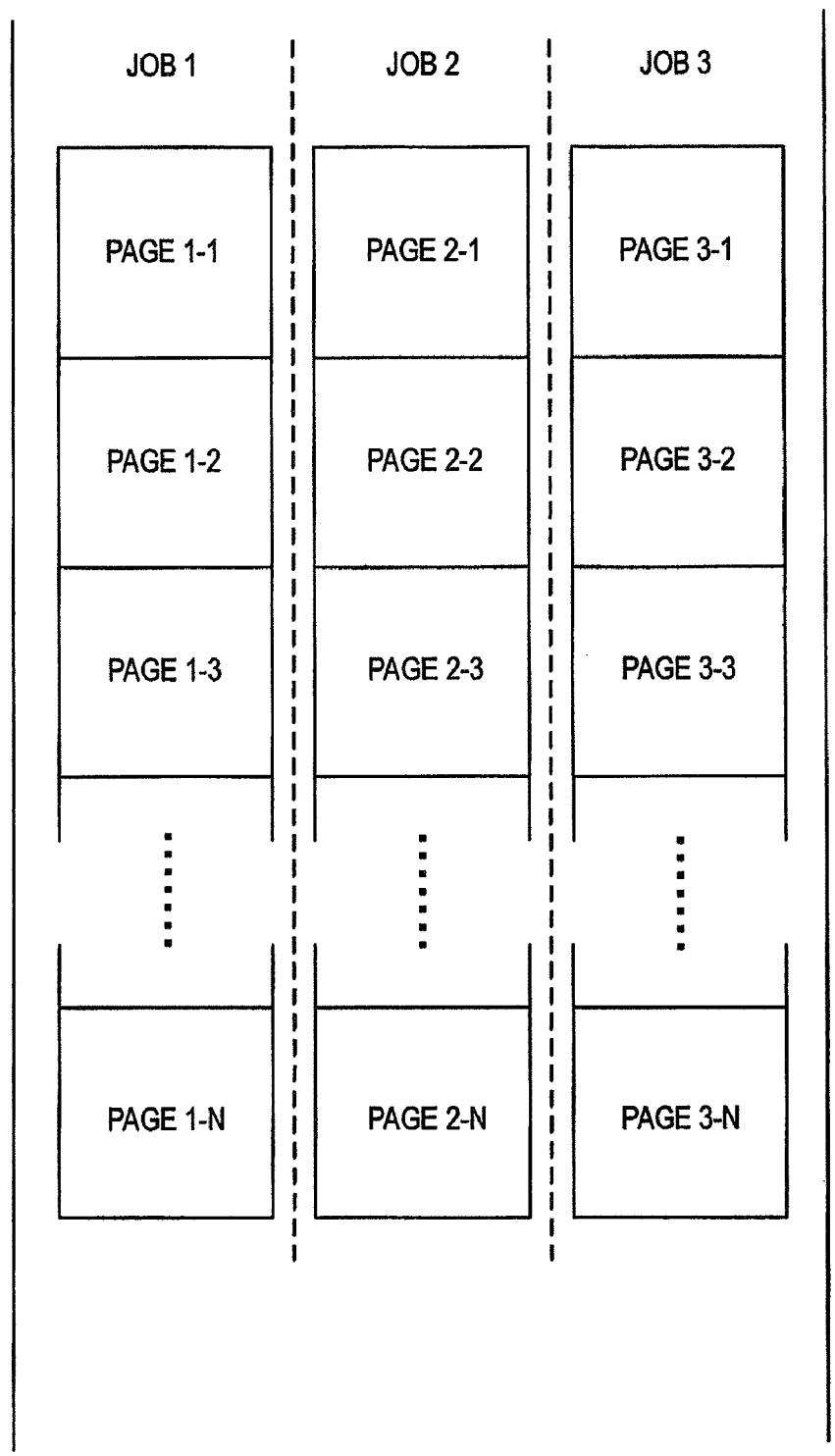
FIG. 7 is a diagram showing a case where images based on three or more print jobs are output onto continuous paper in parallel.

In the print apparatus 1 of this exemplary embodiment, FIG. 4 to FIG. 6D show the case that the images based on the two print jobs are output onto continuous paper in parallel. However, images based on three or more print jobs may be output onto continuous paper in parallel as shown in FIG. 7.

Figure 8:
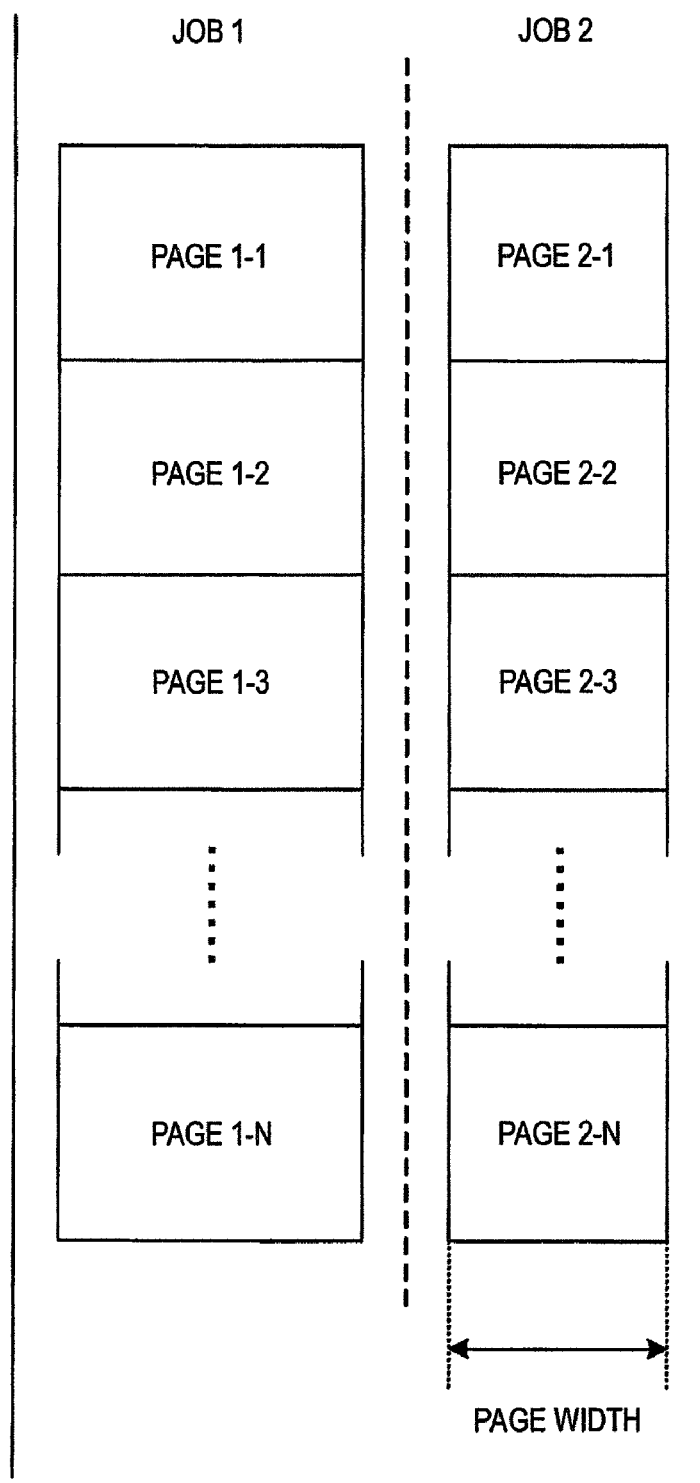
FIG. 8 is a diagram showing a case where images based on plural print jobs which are different in page width are output onto continuous paper in parallel.
Figure 9:
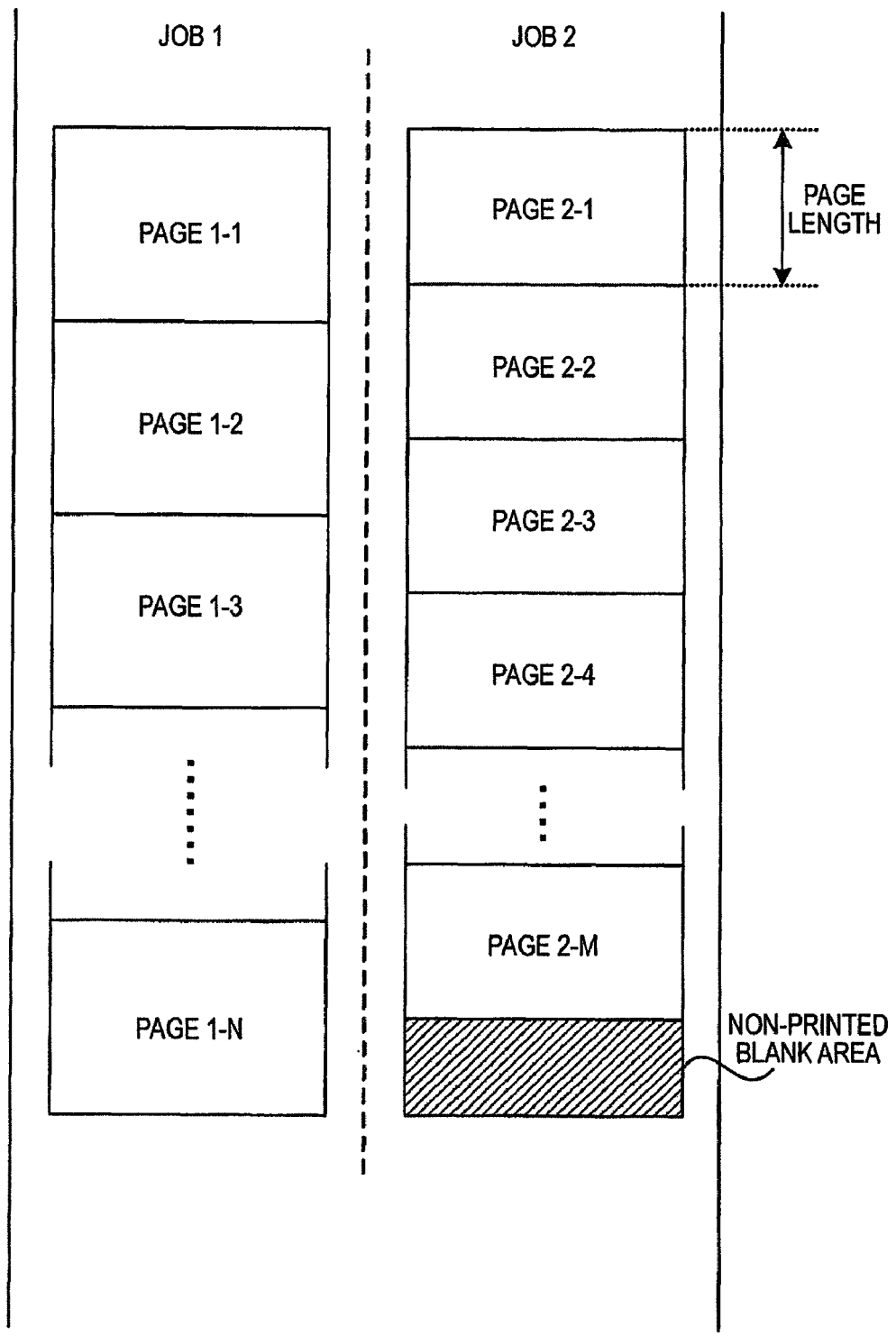
FIG. 9 is a diagram showing a case where images based on plural print jobs which are different in page length are output onto continuous paper in parallel.

FIGS. 4 to 7 show the case that images based on plural different print jobs which are equal to one another in page width (the width in the main scan direction) are output onto continuous paper in parallel. However, according to the print apparatus 1 of this exemplary embodiment, images based on plural print jobs which are different in page width as shown in FIG. 8 may be output onto continuous paper in parallel. Furthermore, according to the print apparatus 1 of this exemplary embodiment, images based on plural print jobs which are different in page length as shown in FIG. 9 may be output onto continuous paper in parallel. The page length corresponds to the length of each page in the auxiliary scan direction. In such a case, the total print lengths of the jobs 1 and 2 are different from each other even when the number of pages is identical between the jobs 1 and 2. Therefore, a non-printed blank area occurs in a print area of one of the jobs 1 and 2.

When image data based on two print jobs which require different lengths of continuous paper (total print lengths of continuous paper) are output onto continuous paper in parallel, the layout determining unit 34 may determine an image layout so that a part of the image based on one of the print jobs is disposed before or after the image based on the other print job.

Figure 10:
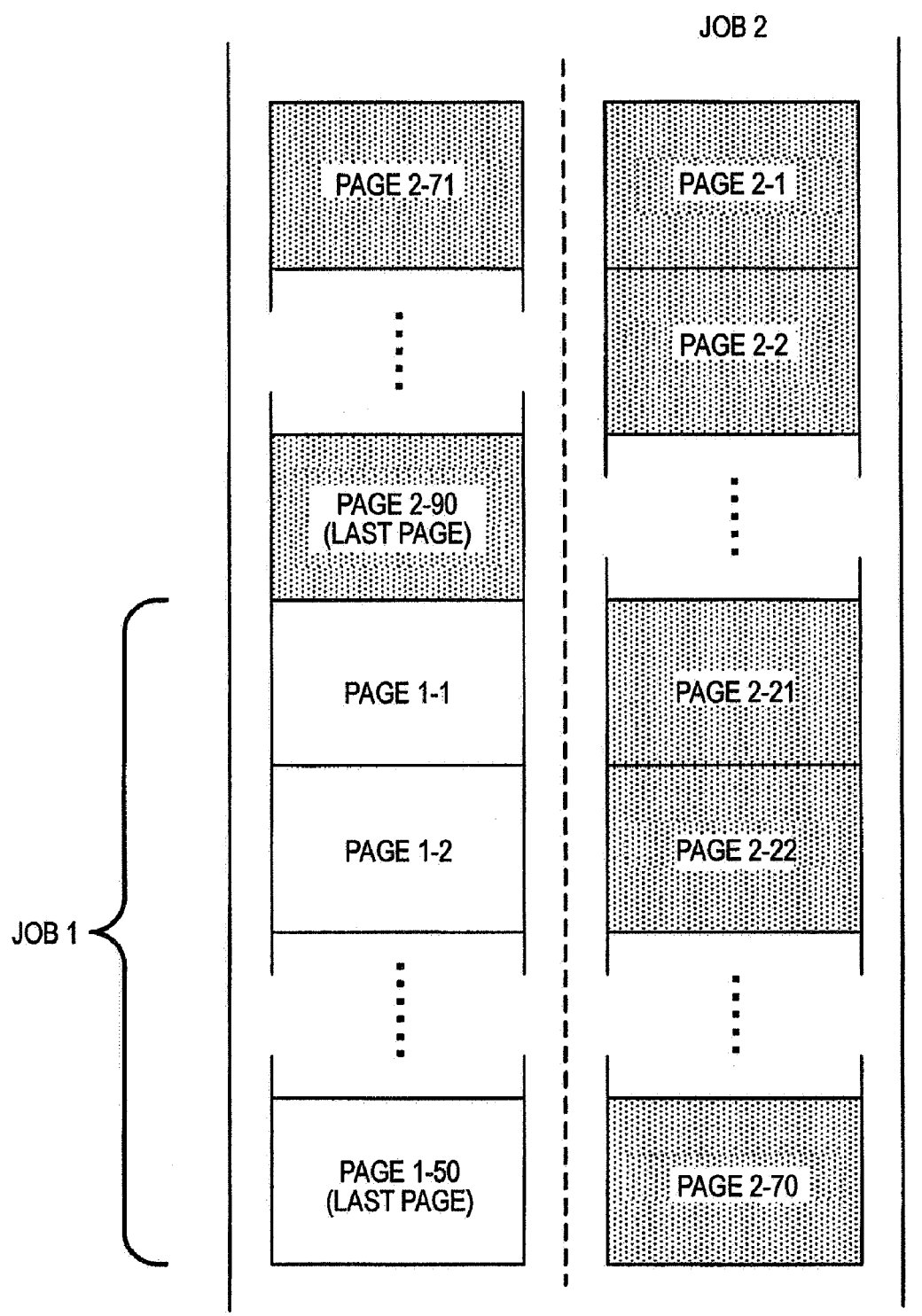
FIG. 10 is a diagram showing a case where a part of an image based on a print job is disposed before an image based on a print job.
Figure 11:
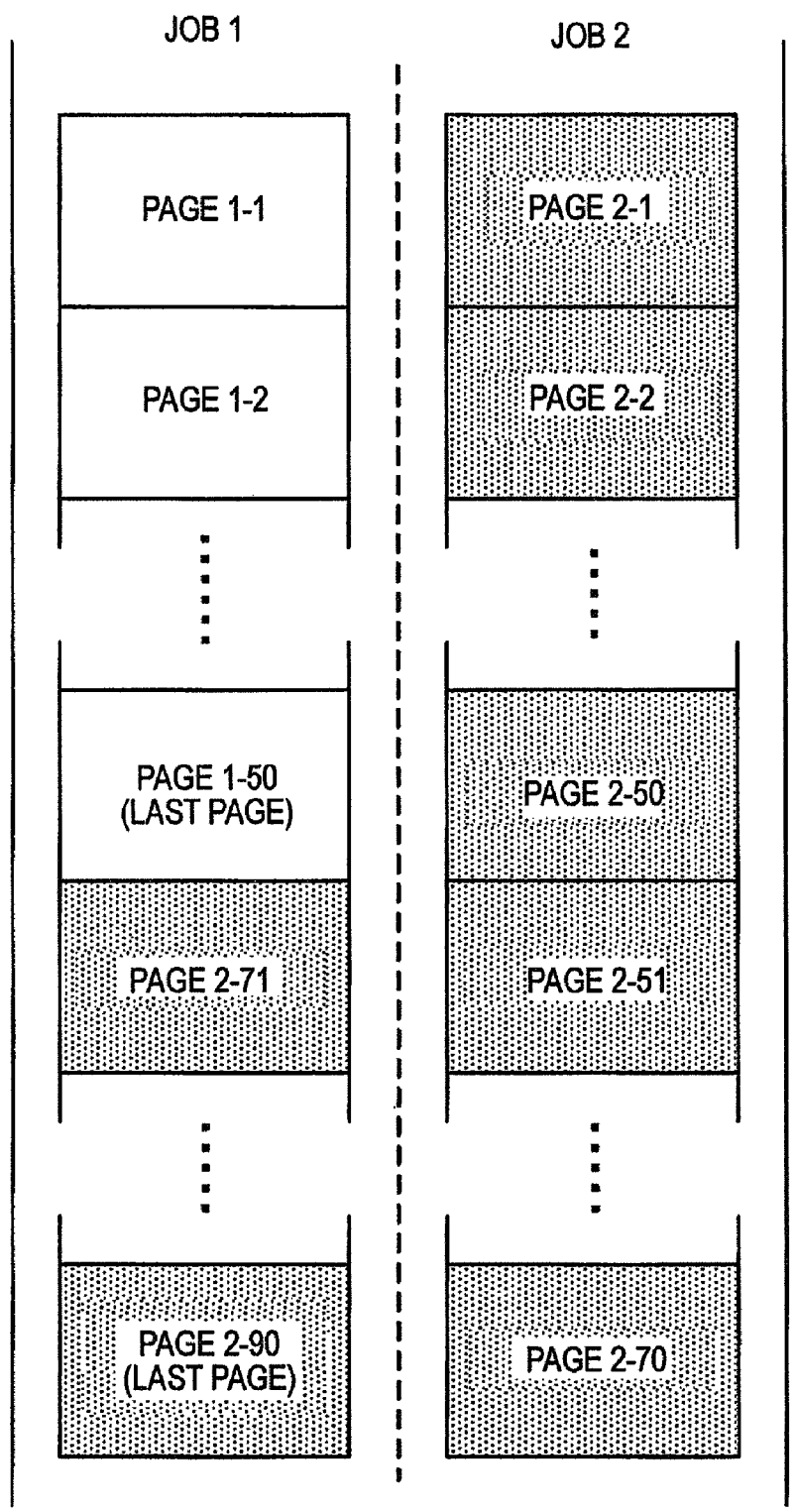
FIG. 11 is a diagram showing a case where a part of the image based on the print job is disposed after the image based on the print job.

For example, in the example of FIG. 10, when the total print length required by the job 2 is longer than the total print length required by the job 1, a part of the image based on the job 2 whose length corresponds to the half length of the differential length between the total print lengths required by the job 1 and the job 2 is disposed before the image based on the job 1. In the example of FIG. 11, a part of the image based on the job 2 whose length corresponds to the half length of the differential length between the total print lengths required by the jobs 1 and 2 is disposed after the image based on the job 1.

The adjustment of the print length between the plural print jobs is not executed at all times, but the user may be allowed to select whether the print length should be adjusted or not. When the adjustment of the print length is selected by the user, the post-processing may be set not to be automatically executed, or an alarm for prohibiting the post-processing may be output.

Figure 12:
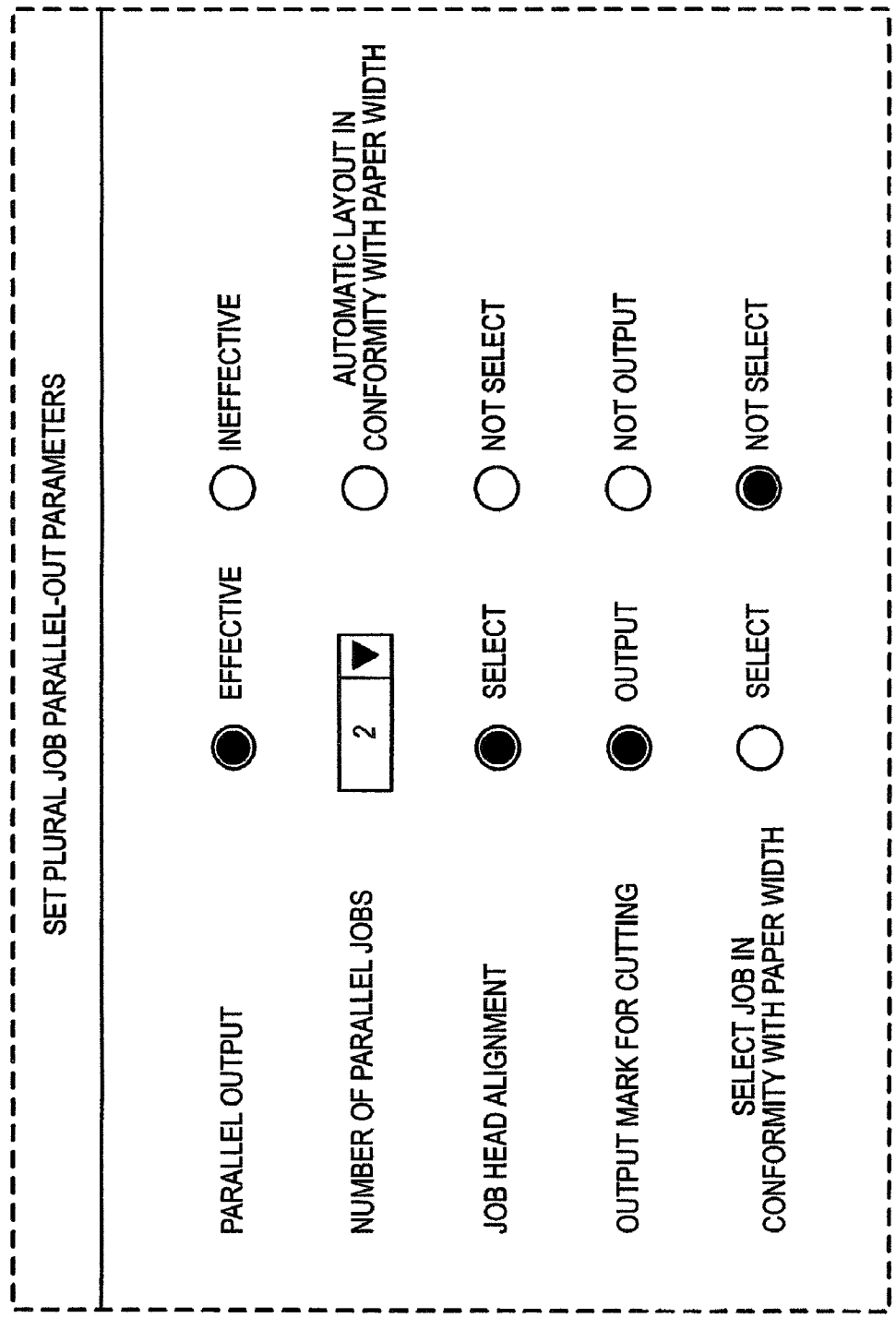
FIG. 12 is a diagram showing an example of a user interface displayed on an operation panel when images based on plural print jobs are output onto continuous paper in parallel.

FIG. 12 shows an example of a user interface displayed on the operation panel 19 when images based on plural print jobs are output onto continuous paper in parallel. The layout determining unit 34 determines the layout processing of plural images by setting various kinds of parameters on the basis of an input from a setting screen of the operation panel 19 as shown in FIG. 12 when the images are output in parallel.

In the display example shown in FIG. 12, when "parallel output" is set to be effective, the parallel output of plural print jobs is selected, and when "parallel output" is set to be ineffective, a normal print method of successively outputting each print job is selected.

Furthermore, "parallel job number" is an item for specifying the number of print jobs to be output in parallel when "parallel output" is set to be effective. Here, when a numerical value is selected, the layout determining unit 34 executes such layout processing that images based on print jobs whose number corresponds to the selected numerical value are output in parallel. Here, when "automatic arrangement fitted to paper width" is selected, the layout determining unit 34 determines plural print jobs to be output in parallel on the basis of the paper width of continuous paper.

When the total of the image widths based on the plural print jobs which are instructed to be output in parallel exceeds the paper width of the continuous paper, the layout determining unit 34 notifies this fact.

Furthermore, "job head alignment" means that plural images to be output in parallel are output while the heads of the images are aligned with one another. Here, when the job head alignment is selected, the layout determining unit 34 determines a layout of images based on plural print jobs which should be output onto continuous paper in parallel so that the head positions of the images are aligned with one another. For example, FIG. 13A shows a case where the job head alignment is not selected, and FIG. 13B shows a case where the job head alignment is selected.

When the job head alignment is executed, the print processing of one print job is not started until the drawing processing of the other print job is finished. Furthermore, when the drawing processing of the plural print jobs can be executed in parallel in the drawing processor 32, the parallel output processing based on the plural print jobs is started at the stage that the processing of one print job requiring the longest drawing processing time is executed by a fixed amount.

It is calculated in advance how degree of difference (for example, the difference in page number, paper length) occurs between a non-printed blank area occurring when the job head alignment is executed and a non-printed blank area occurring when the job head alignment is not executed, and it is notified to a user how degree of blank area occurs needlessly when the job head alignment is executed.

Furthermore, "mark output for cut" is an item for selecting whether a mark to be put for cutting in the post-processing device should be printed or not.

Furthermore, "select job in conformity with paper width" is an item for selecting whether print jobs which can be output in parallel with respect to the paper width of continuous paper currently set in the print mechanism unit 20 are automatically selected and proposed to a user. Here, when "select" is selected, the paper width of continuous paper set in the print mechanism unit 20 is detected, and plural print jobs whose images can be output in parallel with respect to the detected paper width are displayed for the user, whereby the user is allowed to select which print jobs should be executed (i.e., which images of print jobs should be printed).

Figure 14:
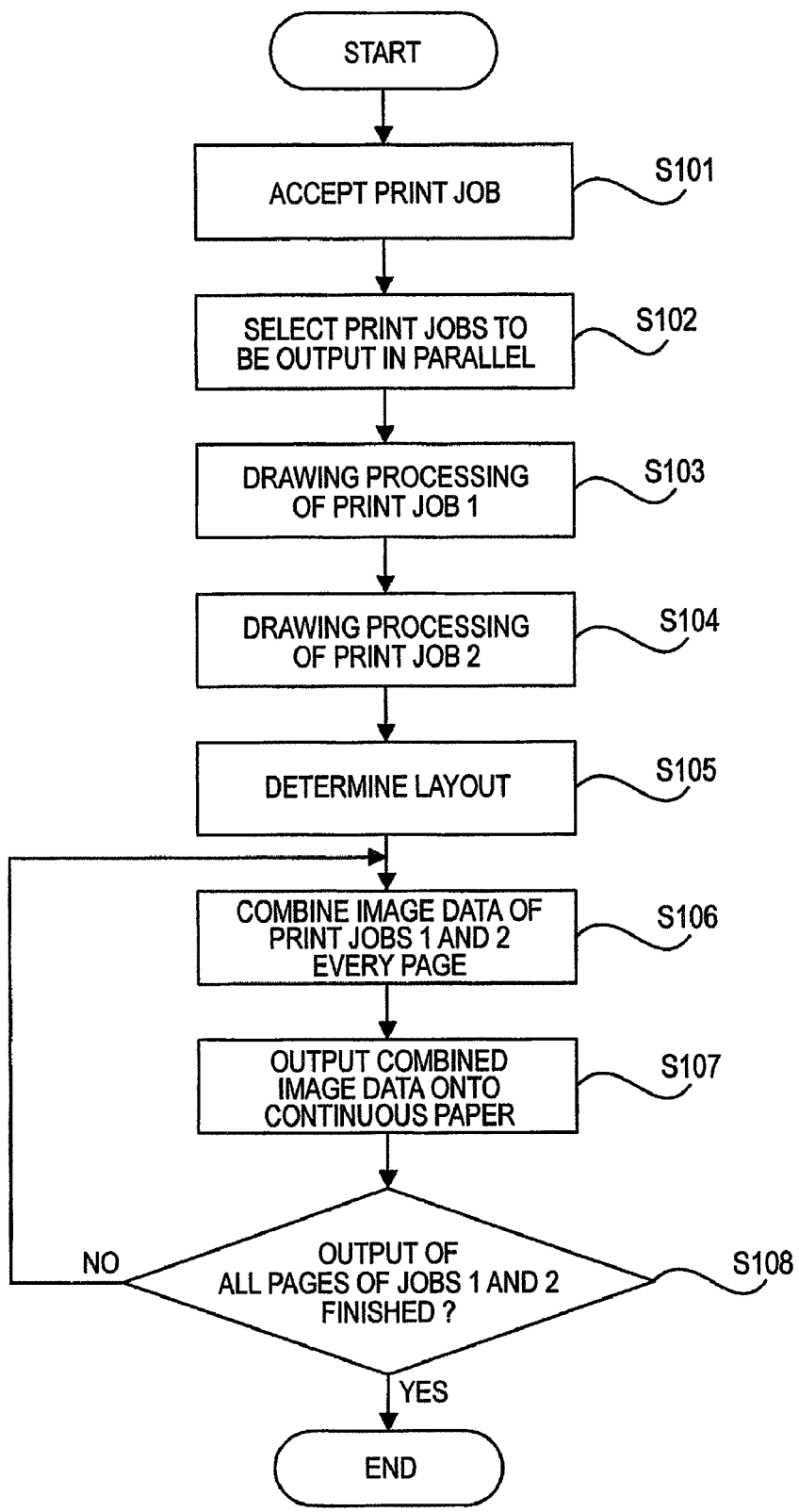
FIG. 14 is a flowchart showing the operation of the print apparatus 1 according to the exemplary embodiment of the present invention.

Next, the operation of the print apparatus 1 according to the exemplary embodiment of the present invention will be described with reference to the flowchart of FIG. 14. First, when the print job accepting unit 31 accepts plural print jobs from the host terminal device 2 (step S101), the print job concerned is temporarily stored into a predetermined storage area (not shown).

During the above operation, in the layout determining unit 34, print jobs to be output in parallel are selected on the basis of a user's instruction from the operation panel 19, post-processing device information, paper information, etc. (step S102). The following description will be made on the assumption that the two print jobs of the print job 1 and the print job 2 are selected as parallel output targets.

In this case, in the drawing processor 32, the print job 1 and the print job 2 for which the parallel output is selected are converted to image data of a raster format and successively stored into the image data memory 33 (steps S103, S104).

In the layout determining unit 34, the layout arrangement of the two image data based on the print jobs 1 and 2 is determined (step S105). In the composition processor 35, the image data based on the print jobs 1 and 2 are combined every page on the basis of the determined layout arrangement (step S106).

The print controller 36 controls the print mechanism unit 20 on the basis of the combined image data, whereby the combined image data are output onto continuous paper (step S107).

The processing of the steps S106 and S107 is repeated until the output of all the pages of the print jobs 1 and 2 is finished (step S108).

In the foregoing description, the print jobs accepted from the host terminal device 2 are successively processed in an accepting order in the print apparatus 1. However, the processing of the print jobs may be executed in an order different from the accepting order.

In such a case, when plural image data based on at least three print jobs are output onto continuous paper in parallel/ the layout determining unit 34 determines the layout of the plural images based on the at least three print jobs so that the total print length is shorter than the case where the images are arranged in the accepting order of the print jobs.

However, in order to enable the parallel output as described above, it is assumed that all the print jobs to be output are converted to image data of the raster format in the drawing processor 32 and stored in the image data memory 33.

The specific description will be described on the assumption that seven print jobs as shown in FIG. 15 are transmitted from the host terminal device 2 to the print apparatus 1. In this case, the number of parallel outputs is set to 2.

Figure 16:
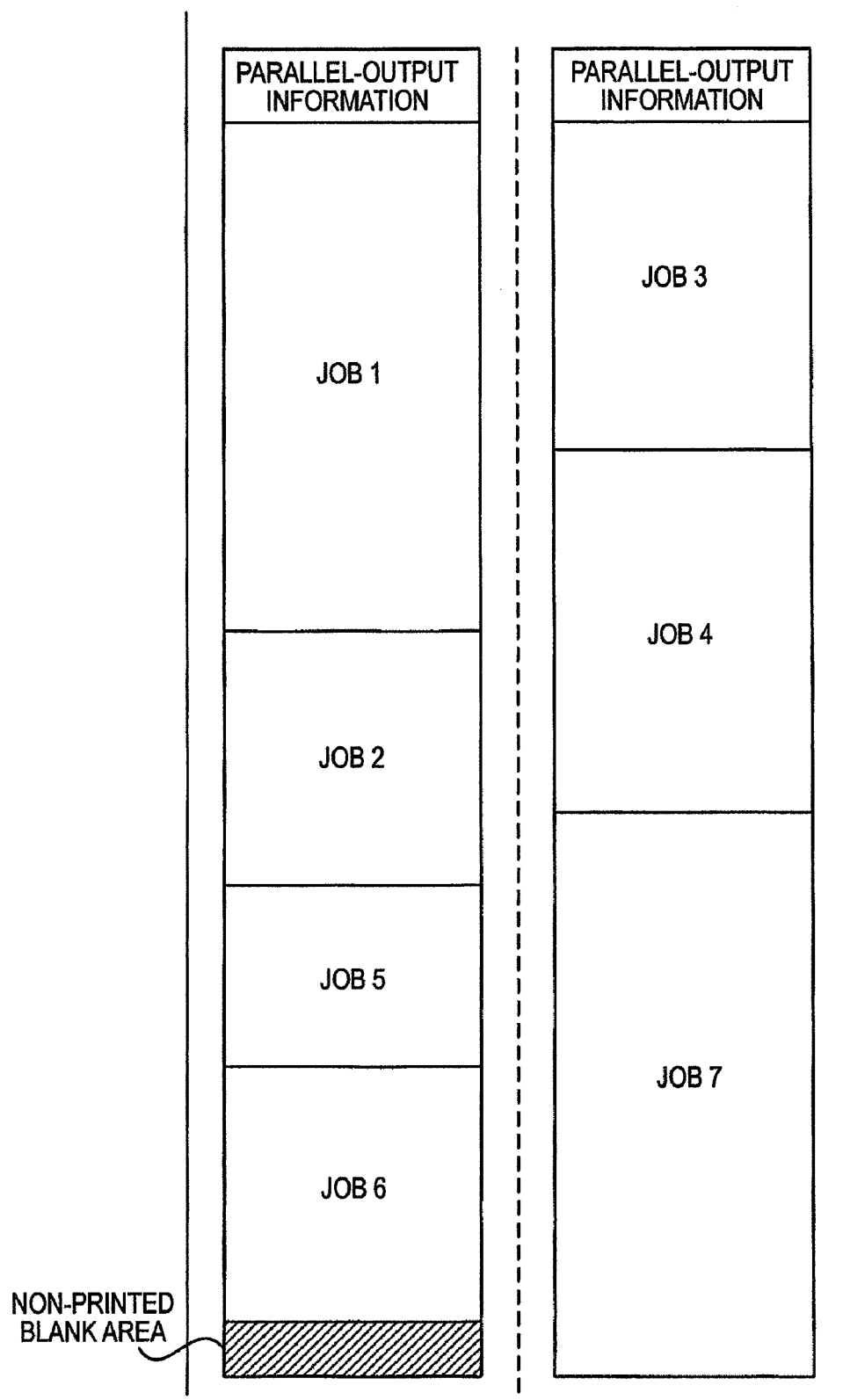
FIG. 16 is a diagram showing an example of the layout of the print jobs when the seven print jobs shown in FIG. 15 are automatically arranged.

In this case, when the seven print jobs are selected and parallel output is instructed, the layout determining unit 34 calculates a job length from the page length and page number of each print job. Then, the layout determining unit 34 totalizes the job lengths of the seven print jobs, and calculates the half length of the total job length as an optimum paper length. The layout determining unit 34 selects a combination of print jobs from the parallel-output instructed seven print jobs so that the total job length of the selected combination is nearest to the optimum paper length. Then, the layout determining unit 34 displays the order of the selected print jobs on the screen of the operation panel 19 or the like. The print on the continuous paper is executed on the basis of the layout of the print jobs determined in the layout determining unit 34. FIG. 16 shows an example of the thus-determined layout of the print jobs.

When the difference between the total job lengths at the right and left sides is equal to a fixed value or more, the layout determining unit 34 may notify the user of this fact. Furthermore, information representing the order of the print jobs on each of the right and left columns may be printed on parallel-output information output to the heads of the right and left columns or the like. When a residual paper amount is known, the layout determining unit 34 may arrange the print jobs in conformity with the residual paper amount.

In the print apparatus 1 according to the exemplary embodiment, a print method of the print mechanism unit 20 will not be described. However, the present invention is applicable to any image forming apparatus irrespective of the print method insofar as the image forming apparatus outputs an image onto continuous paper, and the present invention is applicable to a laser printer or an ink jet printer or a printer using another print method.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The exemplary embodiments were chosen and described in order to best explain the skilled in the art to understand the invention for various exemplary embodiments and with the various modifications as are suited to the particular use contemplated. It is intended that the scope of the invention be defined by the following claims and their equivalents.

What is claimed is:

1. An image forming apparatus comprising:
   an image output unit that outputs an image to a continuous paper;
   a generator that generates an image based on a print instruction by executing drawing processing;
   a determining unit that determines an image layout to output a plurality of images on the continuous paper in parallel based on at least two print instructions;
   a combining unit that combines the plurality of images generated by the generator on the basis of the image layout determined by the determining unit; and
   a controller that controls the image output unit so that the plurality of images combined by the combining unit is output to the continuous paper,
   wherein the at least two print instructions comprise a first print instruction corresponding to a first print job and a second print instruction corresponding to a second print job.

2. The image forming apparatus according to claim 1, wherein the determining unit determines the image layout so that an area having a predetermined width is provided between the plurality of images based on different print instructions.

3. An image forming apparatus comprising:
   an age output unit that outputs an image to a continuous paper;
   a generator that generates an image based on a print instruction by executing drawing processing;
   a determining unit that determines an ayout to output a plurality of images on the continuous paper in parallel based on at least two print instructions;
   a combining unit that combines the plurality of images generated by the generator on the basis of the image layout determined by the determining unit; and
   a controller that controls the image output unit so that the plurality of images combined by the combining unit is output to the continuous paper,
   wherein the determining unit determines the image layout so that an area having a width based on information from a paper cutting device is provided between the plurality of images based on different print instructions.

4. The image forming apparatus according to claim 1, wherein the determining unit determines the plurality of print instructions for the plurality of images arranged in parallel to be included in the output image on the basis of a paper width of the continuous paper.

5. The image forming apparatus according to claim 1, wherein the determining unit determines the image layout to output the image including the plurality of images arranged in parallel on the continuous paper, in which head positions of the plurality of images based on the plurality of print instructions are aligned.

6. An image forming apparatus comprising:
   an image output unit that outputs an image to a continuous paper;
   a generator that generates an image based on a print instruction by executing drawing processing;
   a determining unit that determines an image layout to output a plurality of images on the continuous paper in parallel based on at least two print instructions;
   a combining unit that combines the plurality of images generated by the generator on the basis of the image layout determined by the determining unit; and
   a controller that controls the image output unit so that the plurality of images combined by the combining unit is output to the continuous paper,
   wherein when a plurality of images that require different lengths of continuous paper to be output onto the continuous paper in parallel based on two print instructions, the determining unit disposes one part of the plurality of images based on one of the print instructions prior or subsequent to the other part of the plurality of images based on the other print instruction.

7. An image forming apparatus comprising:
   an image output unit that outputs an image to a continuous paper;
   a generator that generates an image based on a print instruction by executing drawing processing;
   a determining unit that determines an image layout to output a plurality of images on the continuous paper in parallel based on at least two print instructions;
   a combining unit that combines the plurality of images generated by the generator on the basis of the image layout determined by the determining unit; and
   a controller that controls the image output unit so that the plurality of images combined by the combining unit is output o the continuous paper,
   wherein when a plurality of images are output onto the continuous paper in parallel based on at least three print instructions, the determining unit determines a layout of the plurality of images based on the at least three print instruction so that a total print length of the continuous paper is shorter than that in the case where the plurality of images are arranged in an accepted order of the print instructions.

8. The image forming apparatus according to claim 1, further comprising a notifying unit that notifies a user that the total width of the plurality of images based on the plurality of print instructions arranged in parallel to be included in the output image exceeds a width of the continuous paper.

9. A non-transitory computer readable medium storing a program causing a computer to execute a process for document processing, the process comprising:
   generating an image based on a print instruction by executing drawing processing;
   determining an image layout to output a plurality of images on the continuous paper in parallel based on at least two print instructions;

combining the plurality of images generated in the generating on the basis of the image layout determined in the determining; and controlling the outputting so that the plurality of images combined in the combining is output to the continuous paper, wherein the at least two print instructions comprise a first print instruction corresponding to a first print job and a second print instruction corresponding to a second print job.

10. A print apparatus comprising:

an image output unit that outputs an image;

a generator that generates an image based on a print instruction by executing drawing processing;

a determining unit that determines an image layout to print a plurality of images on a continuous paper in parallel based on at least two print instructions;

a combining unit that combines the plurality of images generated by the generator on the basis of the image layout determined by the determining unit;

a controller that controls the image output unit so that the plurality of images combined by the combining unit is output; and a printer that prints the image output from the image output unit onto the continuous paper, wherein the at least two print instructions comprise a first print instruction corresponding to a first print job and a second print instruction corresponding to a second print job.

* * * * *